US007584617B2

(12) United States Patent
Bland et al.

(10) Patent No.: US 7,584,617 B2
(45) Date of Patent: Sep. 8, 2009

(54) MONITORING HEALTH OF A COMBUSTION DYNAMICS SENSING SYSTEM

(75) Inventors: Robert J. Bland, Oviedo, FL (US); Clifford E. Johnson, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 391 days.

(21) Appl. No.: 11/378,026

(22) Filed: Mar. 17, 2006

(65) Prior Publication Data

US 2007/0214796 A1 Sep. 20, 2007

(51) Int. Cl.
*F02C 7/00* (2006.01)

(52) U.S. Cl. .......................................... 60/779; 60/772

(58) Field of Classification Search ................... 60/772, 60/39.091, 779; 701/29–30; 702/182–184
See application file for complete search history.

(56) References Cited

U.S. PATENT DOCUMENTS 5,544,478 A 8/1996 Shu et al.
5,755,819 A 5/1998 Bonanni et al.
5,979,220 A * 11/1999 Zombo et al. ................ 73/23.2
6,205,764 B1 3/2001 Hermann et al.
6,354,071 B2 3/2002 Tegel et al.
6,598,195 B1 * 7/2003 Adibhatla et al. ........... 714/745
6,741,919 B1 * 5/2004 Schuster et al. ............... 701/34
6,840,048 B2 * 1/2005 Han et al. ..................... 60/772
6,877,307 B2 4/2005 Ryan et al.
2002/0005037 A1 1/2002 Tegel et al.
2003/0051553 A1 * 3/2003 Matsuyama et al. ........... 73/708
2004/0211187 A1 10/2004 Catharine et al.
2007/0062196 A1 * 3/2007 Gleeson et al. ............... 60/722

* cited by examiner

*Primary Examiner*—Michael Cuff
*Assistant Examiner*—Andrew Nguyen

(57) ABSTRACT

A method and system (14) for monitoring a health of a combustion dynamics sensing system (10) includes monitoring respective dynamic conditions of at least two combustor cans (16) of a can annular combustor (12) of a gas turbine engine with respective dynamic condition sensors (20) associated with each of the cans. The method also includes establishing a baseline relationship between the respective dynamic conditions and then identifying a variance from the baseline relationship indicative of a degraded signal quality provided by a dynamic condition sensor associated with at least one of the cans.

19 Claims, 2 Drawing Sheets

MONITORING HEALTH OF A COMBUSTION DYNAMICS SENSING SYSTEM

FIELD OF THE INVENTION

The invention relates to gas turbine engines, and more particularly, to a method for monitoring a health of a combustion dynamics sensing system.

BACKGROUND OF THE INVENTION

Gas turbines having can-annular combustors are known wherein individual cans, including a combustion zone within the can, feed hot combustion gas into respective individual portions of an arc of a turbine inlet. The individual cans may receive fuel and air for combustion and be disposed in a ring around a central region of a combustor of the engine. Combustion generated dynamic pressure fluctuations, or combustion dynamics, produced in gas turbine engines, and especially in gas turbine engines having Dry, Low NOx (DLN) combustion systems, need to be carefully monitored and controlled to achieve acceptable system durability and reliability. As DLN combustion systems are increasingly required to be operated more aggressively with regard to emissions and gas turbine cycling, the combustors tend to become less robust against these combustor dynamics. Consequently, system failures caused by excessive dynamics become possible. Typically, continuous monitoring of combustor dynamics with a combustion dynamics sensing system having internally mounted dynamic condition sensors are used to provide advance warning of excessive dynamics that may result in damage to combustion system. Such dynamic condition sensors tend to be expensive and typically require continuous maintenance monitoring to ensure that they are functioning properly. In addition, combustion dynamics sensing system problems, such as water in damping tube of the system or signal amplifier failures, may result in erroneous dynamic condition signals being generated.

BRIEF DESCRIPTION OF THE DRAWINGS

The invention is explained in following description in view of the drawings that show.

DETAILED DESCRIPTION OF THE INVENTION

Figure 2:
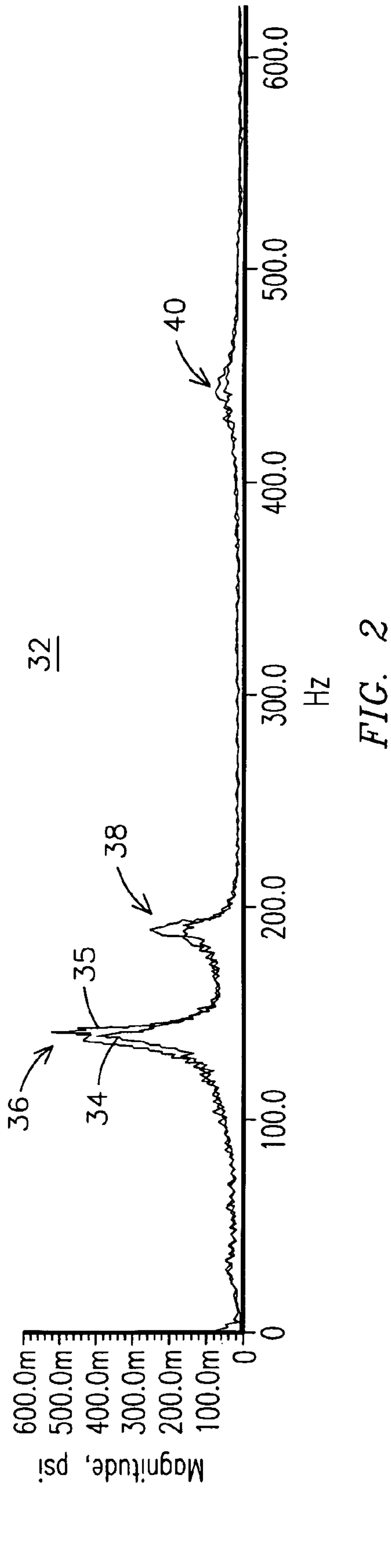
FIG. 2 shows an example frequency spectrum of a Fourier-transformed acoustic waveform signal for a conventional DLN-type can annular combustor.
Figure 3:
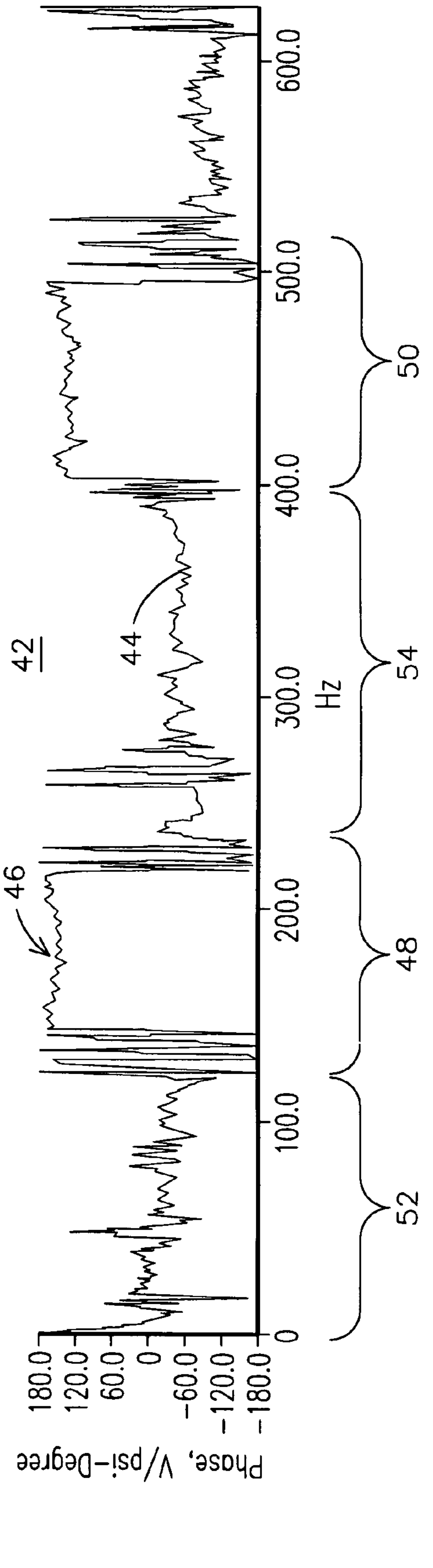
FIG. 3 shows an example phase spectrum of a Fourier-transformed acoustic waveform signal corresponding to the frequency spectrum of FIG. 2.

Individual cans of a can annular combustor of a gas turbine engine may exhibit amplitude spikes at certain acoustic frequencies during operation. FIG. 2 shows an example frequency spectrum 32 of respective Fourier-transformed acoustic waveform signals 34, 35 for two adjacent cans of a conventional DLN-type can annular combustor. As shown in FIG. 2, amplitude spikes 36, 38, 40 typically occur at about 140 Hz, 190 Hz, and 440 Hz, respectively. In addition to exhibiting such amplitude spikes, adjacent cans of a can annular combustor may interact dynamically with one another at these acoustic frequencies. For example, adjacent cans may interact in a push-pull mode, wherein a phase signal corresponding to an amplitude spike for one of the cans of an adjacent pair is 180 degrees out of phase with respect to the other can of the pair. In the case of a can annular combustor having an even number of cans, it has been demonstrated that a phase angle difference between dynamic conditions of adjacent cans at certain acoustic frequencies consistently varies by about 180 degrees. FIG. 3 shows an example difference phase spectrum 42 of a Fourier-transformed acoustic waveform signal 44 for the two adjacent cans corresponding to the frequency spectrum of FIG. 2. As shown in FIG. 3, a phase angle difference 46 between adjacent cans may be 180 degrees in a range of frequencies 48, 50 around the amplitude spike frequencies 36, 38, 40. Conversely, at frequencies e.g., 52, 54 away from the range of frequencies 48, 50 around the amplitude spike frequencies, the phase angle difference between adjacent cans may approach zero.

The inventors of the present invention have innovatively recognized that a variance of a dynamic condition of a can from a baseline dynamic condition relationship with another can may be indicative of an abnormal health condition of the sensing system. For example, if a monitored phase angle difference between adjacent cans varies less than a baseline phase angle difference value of about 180 degrees, the monitored phase angle difference may be indicative of a sensor system failure corresponding to one or both of the cans being monitored. Accordingly, a health of a combustion dynamics sensing system may be assessed by monitoring a sensed dynamic condition, such as a phase relationship between at least two cans of a can annular combustor, and identifying a variance from a baseline relationship indicative of a degraded signal quality provided by a dynamic condition sensor associated with at least one of the cans. By tracking phase relationships among sensed dynamic conditions of the cans over time, signal qualities corresponding to dynamic condition sensors associated with each of the cans may be identified as being degraded, for example, when a baseline phase relationship varies outside of predetermined limits.

Figure 1:
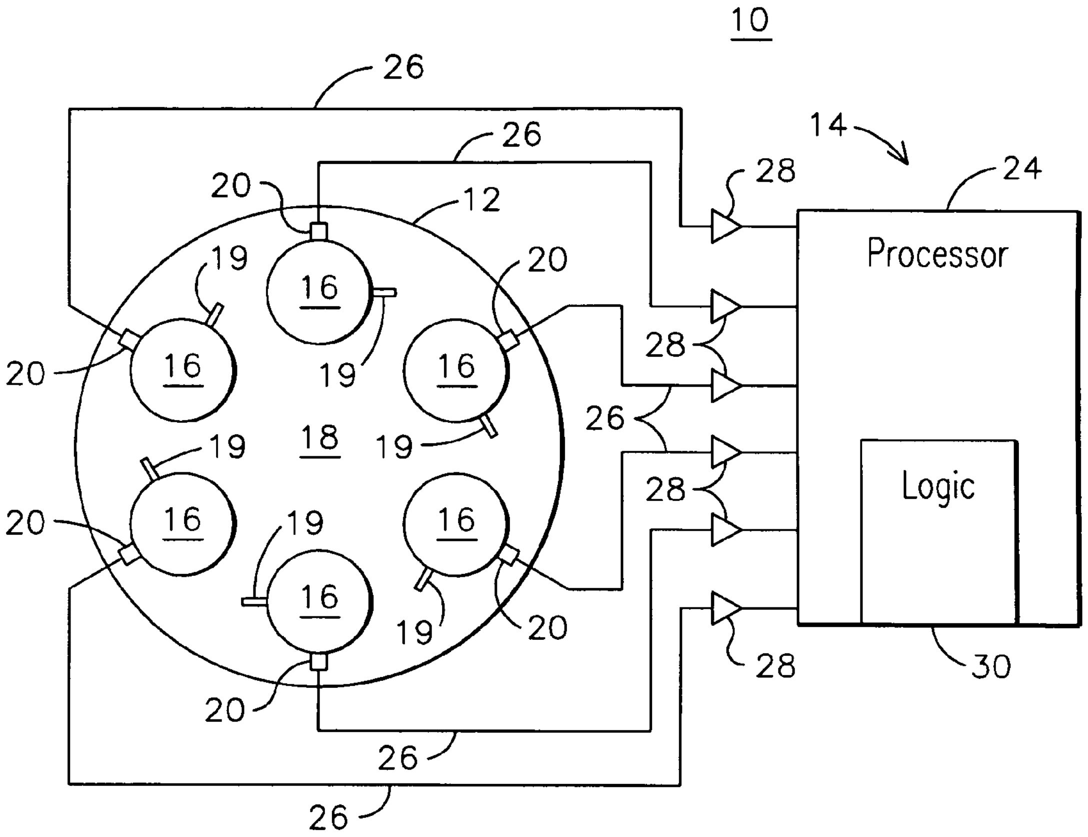
FIG. 1 is a schematic cross sectional diagram of a can annular combustor of a gas turbine engine including a system for monitoring a health of a combustion dynamics sensing system.

FIG. 1 is a schematic cross sectional diagram of a can annular combustor 12 of a gas turbine engine (not shown) including a system 14 for monitoring a health of a combustion dynamics sensing system 10. The combustor 12 includes a plurality of combustor cans 16 disposed in a ring about a central region 18 of the combustor 12. Fuel and air are typically mixed and combusted in each of the combustor cans and hot combustion gases produced by each of the cans are fed into a downstream turbine (not shown) to extract power from the hot combustion gases.

As a result of combustion, the cans 16 are subjected to a variety of combustion effects. For example, the cans 16 may be subject to combustion dynamics that may be detrimental to operation of the combustor 12. Each can 16 may be fitted with a damping tube 19 to help damp combustor dynamics. In addition, combustor dynamic sensing systems 10 are typically used to monitor dynamic conditions of the combustor 12, such as the dynamic conditions of each of the cans 16 of a can annular combustor 12. A combustor dynamics sensing system 10 may include a plurality of dynamic condition sensors 20 disposed proximate the cans 16 to sense respective dynamic operating conditions of the cans 20. In one embodiment, dynamic condition sensors 20 may include a pressure sensor, an acoustic sensor, an electromagnetic energy sensor, an optical sensor, or other type of sensor known in the art for sensing a combustion dynamic parameter responsive to combustion dynamics in the cans 16 of the combustor 12. The sensors 20 may provide raw signals 26 responsive to the respective combustion dynamics to a processor 24. Processor 24 may take any form known in the art, for example an analog or digital microprocessor or computer, and it may be integrated into or combined with one or more controllers used for other functions related to an operation of the gas turbine engine. In an example embodiment, the raw signals 26 may be conditioned by signal processing elements, such as amplifiers 28 amplifying the signals 26, before being provided to the processor 24.

The processor 24 may perform signal processing of the received signals 26, such as by executing a Fast Fourier Transform (FFT) on the received signals 26 to generate amplitude and phase information in the frequency domain, such as shown in FIGS. 2 and 3, from which combustion dynamics of the respective cans 16 may be determined. As described previously, a phase angle difference between adjacent cans 16 of the can annular combustor 12 may differ by about 180 degrees in a frequency range region around an amplitude spike. Such phase angle difference information may be readily discerned from FFT transformed data as shown in FIGS. 2 and 3.

In an embodiment of the invention, the processor 24 may be configured for monitoring a health of the combustion dynamics sensing system 10. For example, the processor 24 may be configured to use a dynamic condition relationship responsive to combustion in respective cans 16 to identify a degraded signal quality of one of the signals 26. The steps necessary for such processes may be embodied in programmable logic 30 accessible by the processor 24. The logic 30 may be embodied in hardware, software and/or firmware in any form that is accessible and executable by processor 24 and may be stored on any medium that is convenient for a particular application.

The steps may include monitoring respective dynamic conditions of at least two combustor cans of the can annular combustor, such as two adjacent cans. In an embodiment, the dynamic conditions may be monitored within a frequency range associated with a spiked, or peak, dynamic frequency response condition. For example, frequency ranges of about 120 Hz to about 220 Hz and about 400 Hz to about 500 Hz may be monitored. Other frequencies and/or frequencies ranges may be monitored as desired. Monitoring may include obtaining raw signals responsive to combustion in a plurality of the cans, and then performing a transformation operation, such as an FFT on the raw signals to generate respective phase angle information corresponding to each signal.

The steps may also include establishing a baseline relationship between the respective dynamic conditions. For example, the baseline relationship may include phase relationships between phase angle values of the respective dynamic conditions at common frequencies. The baseline relationship may include an out of phase relationship between cans comprising a phase angle difference of about 180 degrees at a certain frequency. In an aspect of the invention, the baseline relationship may be continually monitored and an average value for the relationship may be calculated. Once a baseline relationship is established, a variance from the baseline relationship may be identified as being indicative of an anomalous dynamic condition reading. For example, a variance away from a baseline relationship may include a sensed phase angle difference between adjacent cans being less than about one hundred and eighty degrees. In an embodiment of the invention, a phase angle variance indicative of an anomalous dynamic condition may be in the range of more than about 10 degrees, and preferably more that about 20 degrees, and even more preferably about 30 degrees, +/−, away from 180 degrees. In an embodiment, occurrence of a variance and/or a time period associated with an occurrence of a variances may serve as a criteria for sending notification of an anomalous dynamic condition reading.

It has been demonstrated by the inventors that a phase angle difference variance may be indicative of a degraded signal quality. In an aspect of the invention, a phase angle difference variance provided by a dynamic condition sensor associated with at least one of the cans of a pair of adjacent cans away from a baseline relationship may indicate a problem with the health of the dynamics condition sensing system. For example, the variance in the phase angle difference may be a result of a damping tube associated with one of the cans being contaminated with water, or failure of a signal amplifier associated with one of the cans. The phase information may be analyzed for variances by comparing the phase information for each signal at a desired frequency and/or in a selected range of frequencies to evaluate a signal reliability of the raw signals. When phase variances are identified, notification may be provided to indicate presence of an anomaly in the dynamic condition sensing system that may require further investigation, and/or servicing of the dynamic condition sensing system. It may also be possible to correlate an identified variance with a specific component and/or specific degraded condition of the dynamic condition sensing system.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

What is claimed is:

1. A method for monitoring a health of a combustion dynamics sensing system comprising:
- monitoring respective dynamic conditions of at least two combustor cans of a can annular combustor of a gas turbine engine with respective dynamic condition sensors associated with each of the cans;
- determining relationships between the respective dynamic conditions of adjacent cans;
- establishing a baseline relationship for each relationship between the respective dynamic conditions of adjacent cans; and
- identifying a variance of a relationship between the respective dynamic conditions of adjacent cans from the respective baseline relationship indicative of a degraded signal quality provided by a dynamic condition sensor associated with at least one of the cans.

2. The method of claim 1, wherein the relationship comprises a phase relationship between phase angle values of the respective dynamic conditions.

3. The method of claim 2, wherein the phase relationship comprises an out-of-phase relationship.

4. The method of claim 3, wherein the out-of-phase relationship comprises a phase angle difference of about one hundred and eighty degrees.

5. The method of claim 4. wherein the variance comprises a phase angle difference of more than about 10 degrees away from one hundred and eighty degrees.

6. The method of claim 4, wherein the variance comprises a phase angle difference of more than about 20 degrees away from one hundred and eighty degrees.

7. The method of claim 4, wherein the variance comprises a phase angle difference of more than about 30 degrees away from one hundred and eighty degrees.

8. The method of claim 1, further comprising monitoring the dynamic conditions within a frequency range associated with a peak dynamic frequency condition.

9. The method of claim 8, wherein the frequency range extends from about 120 Hertz to about 220 Hertz and about 400 Hertz to about 500 Hertz 10. The method of claim 8, wherein the frequency range extends from about 400 Hertz to about 500 Hertz.

11. The method of claim 1, wherein the degraded signal quality is indicative of a water contaminated damping tube associated with at least one of the cans.

12. The method of claim 1, wherein the degraded signal quality is indicative of a failure of a signal processing element associated with at least one of the dynamic condition sensors.

13. A system for monitonng a health of a combustion dynamics sensing system of a can annular gas turbine engine comprising;

a plurality of sensors for sensing respective dynamic operating conditions of cans of a can annular combustor of a gas turbine engine;

a processor receiving respective sensed dynamic condition signals from the plurality of sensors; and programmed logic operable with the processor for monitoring respective dynamic operating conditions of cans, determining relationships between the dynamic operating conditions of adjacent cans, establishing a baseline relationship for each relationship between dynamic operating conditions of adjacent cans, and for identifying a variance of a relationship between the respective dynamic conditions of adjacent cans from the respective baseline relationship indicative of a degraded signal quality provided by a sensor associated with at least one of the cans.

14. A method for monitoring a health of a combustion dynamics sensing system comprising:

obtaining raw signals responsive to combustion in a plurality of cans of a can annular combustor of a gas turbine engine;

performing a transformation operation on the raw signals to generate respective phase information corresponding to each signal;

determining phase relationships between respective adjacent cans;

establishing a baseline relationship for each phase relationships between respective adiacent cans; and comparing the phase relationships to respective baseline phase relationships for each signal in a selected range of frequencies to evaluate a signal reliability of the raw signals.

15. The method of claim 14, wherein the transformation operation comprises a Fourier transform.

16. The method of claim 14, wherein the raw signals comprise pressure sensor signals.

17. The method of claim 14, wherein the raw signals comprise optical sensor signals.

18. The method of claim 14, wherein the raw signals comprise acoustic sensor signals.

19. The method of claim 14, wherein the raw signals comprise electromagnetic sensor signals.

* * * * *